United States Patent [19]

Haruta et al.

[11] 3,974,041

[45] Aug. 10, 1976

[54] IMAGE RECORDING MEMBER WITH ZEOLITIC WATER CONTAINING COMPOUNDS

[75] Inventors: Masahiro Haruta, Funabashi; Yasushi Takatori, Machida; Akemi Shimosawa, Tokyo; Katsuhiko Nishide, Yokohama; Mitsunobu Nakazawa, Tokyo, all of Japan

[73] Assignee: Canon Kabushiki Kaisha, Tokyo, Japan

[22] Filed: Dec. 5, 1974

[21] Appl. No.: 529,933

[30] Foreign Application Priority Data

Dec. 10, 1973 Japan .............................. 48-139763

Dec. 10, 1973 Japan .............................. 48-139764

[52] U.S. Cl. .................................. 204/2; 346/74 E; 346/135

[51] Int. Cl.$^2$ ..................... B41M 5/20; G01D 15/34

[58] Field of Search .............. 346/74 E, 74 ES, 135; 96/1.5, 1 E; 204/2

[56] References Cited

UNITED STATES PATENTS

| | | | |
|---|---|---|---|
| 2,358,839 | 9/1944 | Wagner | 346/74 EL |
| 2,631,918 | 3/1953 | Kozak | 346/74 EL |
| 3,212,931 | 10/1965 | Kubota | 346/74 EL |
| 3,694,202 | 9/1972 | Sawyer | 96/1.5 |

FOREIGN PATENTS OR APPLICATIONS

| | | | |
|---|---|---|---|
| 1,092,600 | 11/1967 | United Kingdom | 96/1.5 |

*Primary Examiner*—Bernard Konick

*Assistant Examiner*—Jay P. Lucas

*Attorney, Agent, or Firm*—Fitzpatrick, Cella, Harper & Scinto

[57] ABSTRACT

An image recording member according to the present invention comprises a recording layer containing at least one image forming component and at least one reducing agent in an electrically conductive matrix composed of at least one zeolitic water-containing compound.

31 Claims, 3 Drawing Figures

IMAGE RECORDING MEMBER WITH ZEOLITIC WATER CONTAINING COMPOUNDS

BACKGROUND OF THE INVENTION

1. Field of the Invention

This invention relates to an image recording member for recording an image by application of electricity, which is usable in recording various signals such as those of fascimile recording, computer output and its terminal equipment, data from various kinds of measuring instruments for industry, medicine, business and the like.

2. Description of the Prior Arts

With developments in facsimile recording and the like, recording of electrical signals in the form of images has been increasing as the years go by. The most widely used conventional techniques to meet such demands are, for example, electric discharge recording and electrolytic recording.

In electric discharge recording, however, there exist various disadvantages such as very strong and irritating smell which results from recording, dust from perforation of the surface layer, and stylus wear as a result of the discharge recording, because the surface layer of the recording member is perforated by electric discharging heat from the stylus.

Moreover, owing to bending, pressure-adhesion, and other mechanical forces, the black layer of the recording member is liable to be exposed outside to stain the recording paper. In addition, the surface layer of the recording member is made thin to facilitate generating the required electric discharge, hence the black layered base cannot be concealed perfectly thereby causing the recording member as a whole to assume a greyish color rather than pure white and thereby reducing the quality of the recording member.

On the other hand, in electrolytic recording, preservation of the recording paper is not satisfactory, as the method is of a wet type and the quality of the recorded image is affected by the amount of the toner. Furthermore, after the completion of the image recording, the recording paper is subjected to deformation such as waving and the like, due to drying. Such phenomena are all ascribable to the inherent defects of the wet method.

In order to solve these various defects in conventional recording methods, various new methods have been attempted such as disclosed in Japanese Patent Publications No. 38-22341, No. 44-29630, No. 42-5476, and No. 42-13239.

In Japanese Patent Publications No. 38-22341 and No. 44-29630, there is proposed the use of a dry type electro-sensitive recording sheet to obtain an image by dispersing an electrically reducible metallic compound in an electrically insulating resin, and then reducing the metallic compound to the free metal by electric conduction. In this type of recording sheet, however, most of the metallic compounds having relatively high electric conductivity are colored, and those metallic compounds which are less colored have a low electric conductivity. Therefore, in order that such metallic compounds of low electric conductivity may be properly electrically conductive, both chemical and physical treatment becomes necessary. By such treatment, however, the metallic compounds are colored with the consequence that the color density of the base sheet becomes considerably high. Moreover, in view of the fact that the metallic compound is low in electrical conductivity, there occurs electric discharge at the time of the recording and the heat from this electric discharge brings about bad smell, or causes the stylus to wear out considerably.

Further, in Japanese Patent Publications No. 42-5476 and No. 42-13239, there is proposed a method wherein an electrically conductive coating is formed by use of the evaporative deposition method onto a white or transparent material such as silica, and so forth, after which the combination of the base material and the electrically conductive coating are dispersed in a matrix for electric conduction. This method, however, requires considerable skill in the process for treating the same.

As stated in the foregoing, even in the electro-sensitive recording medium of the heretofore known type, no satisfactory result could be obtained.

In view of these facts, the present inventors have proposed an entirely novel dry type electrically conductive recording method and the recording material to be used therefor with a view to eliminating various defects in the conventional electrically conductive recording method or recording material.

This proposal, in summary, is characterized in that, in the method of electrically recording an image, binary components of (A) a zeolitic water containing compound, and (B) an image former are caused to be present in the recording medium, and the required image is formed by carrying out electric conduction through the recording medium. The proposal also is directed to the electrically conductive recording material to be used for carrying out such method. As a whole, the proposal made by the present inventors is to utilize the electric conductivity of the zeolitic water containing compound so as to effectively render color-development of the image forming agent for the desired image recording.

However, even in the recording member as proposed by the present inventors further improvement is required, particularly, of amplification in the color development reaction of the color developing component, stability of the recorded image against lapse of time, stability in preservation of the recording member per se, and so on.

SUMMARY OF THE INVENTION

With the foregoing problems in mind, it is the primary object of the present invention to provide an image recording member, in which the electric conductivity in the recording layer is improved, and in which the image reaction proceeds advantageously.

It is another object of the present invention to provide an image recording member which is in an apparent state of perfect dryness, and which yields stabilized recordability irrespective of the degree of humidity at the time of the recording operation.

It is still another object of the present invention to provide an image recording member which has excellent response to even very fine variations in the quantity of the electric conduction, is excellent in the quality of the recorded image, and is superior in the reproduction of the image tone.

It is a further object of the present invention to provide an image recording member, in which amplification of the image forming reaction (color developing reaction) has been achieved.

It is yet another object of the present invention to provide an image recording member, in which stability of the recorded image against lapse of time is increased.

It is yet another object of the present invention to provide an image recording member having a high degree of whiteness and excellent touch as the recording sheet.

It is a still further object of the present invention to provide an image recording member having good preserving stability over a long period of time.

It is a further object of the present invention to provide an image recording member having high stability at the time of its manufacture and use, and having the least toxicity.

It is a still further object of the present invention to provide an image recording member, the production process of which is simple, and the manufacturing cost of which is fairly reduced.

Briefly speaking, according to the present invention, there is provided an image recording member which comprises a recording layer containing at least one image forming component and at least one compound having reduction capability, i.e. a reducing agent, in an electrically conductive matrix composed of at least one zeolitic water-containing compound.

The foregoing objects and other objects of the present invention as well as the mechanism for the image recording will become more apparent from the following detailed description of the invention when read in connection with several preferred examples thereof and the accompanying drawings.

DESCRIPTION OF THE PREFERRED EMBODIMENTS

Figure 1:
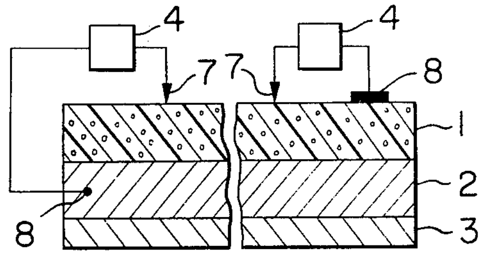
FIGS. 1, 2, and 3 schematically illustrate the structure of the image recording member according to the present invention along with the method of recording images thereon by electric conduction.

A: Components Constituting The Image Recording Member

The term "zeolitic water-containing compound" as used in this specification designates a compound that satisfies the following requirements:

1. The compound should contain water (i.e., zeolitic water) which is slightly combined therewith in cavities formed within its structure, whereby, even in the state of the compound containing a sufficient quantity of zeolitic water, it is free from stickiness due to deliquescence and efflorescence as seen in sodium chloride and the like, so that the compound is seemingly in a dry state;

2. The structure of the compound should be free from deterioration, even after the zeolitic water contained therein is completely removed by means such as, for example, heating and reduced pressure;

3. The compound should be of such nature that after complete removal of the zeolitic water, it reabsorbs water promptly at low humidity conditions so as to resume the original saturated condition; and 4. The compound should contain zeolitic water and various kinds of ions, whereby it exhibits excellent electric conductivity.

As stated in the foregoing, the zeolitic water-containing compound exhibits very specific physical properties, wherein it shows substantially identical properties whether it is being dispersed in a binder, or is being used alone. The present invention is based on such specific properties of the zeolitic water-containing compound.

Representative examples of zeolitic water-containing compounds may be categorized as follows.

First, various kinds of condensed acids are illustrative. A typical acid is natural zeolite. It is called aluminum silicate and is represented by the following general formula:

$$[M^{2+}, (M^{+})_2]O \cdot Al_2O_3 \cdot mSiO_2 \cdot nH_2O \ (3 \leqq m \leqq 10)$$

where $M^{2+}$ and $M^{+}$ indicate divalent and monovalent metal ions, respectively. These ions are usually $Ca^{2+}$ and sometimes $Sr^{2+}$, $Ba^{2+}$, and $K^{+}$ which are replaceable with other cations.

These zeolites contain specific cavities in the three dimensional structure, and the abovementioned replaceable cations are held in these cavities with water molecules. Other organic solvents may be absorbed in the cavities, and solvents of high polarity are selectively absorbed. There are a number of synthetic zeolites which have suubstantially the same three-dimensional structure as the natural zeolite and which are identical with natural zeolite with regard to their basic properties. Furthermore, there are natural or synthetic compounds which have chemical compositions completely different from zeolite, but have the same basic properties as zeolite, that is, they have cavities in the structures and do not change their structures in absorption and desorption of water. They are called zeolite-like compounds and may also be used in the present invention.

Zeolites as used herein including natural as well as synthetic compounds may be classified as follows:

| | |
|---|---|
| (1) Analcite Group: | |
| Analcite | $NaAlSi_2O_6.H_2O$ |
| Pollucite | $(Cs,Na)AlSi_2O_6.xH_2O$ (x<10) |
| Viseite | $Ca_{10}Na_2Al_{10}Si_6P_{10}(H_3)_{12}(H_2O)_{16}.O_{96}$ |
| Kehoesite | $Zn_{5.5}Ca_{2.5}Al_{16}P_{16}(H_3)_{16}(H_2O)_{32}O_{96}$ |
| (2) Sodalite Group: | |
| Hydrosodalite | $Na_8(Al_6Si_6O_{12})(OH)_2$ |
| Faujasite | $Na_{28.6}Ca_{14.8}(Al_{57.6}Si_{134.4}O_{384})262.3H_2O$ |
| Molecular sieve A* | $Na_{12}(Al_{12}Si_{12}O_{24})NaAlO_2.29H_2O$ |
| Molecular sieve X* | $Na_2(Al_2Si_{2.8}O_{9.6}).xH_2O$ (x≈6) |
| Molecular sieve Y* | $Na_2O.Al_2O_3.3\sim6\ SiO_2.xH_2O$ |
| Molecular sieve SK* | substantially identical to faujasite |
| (3) Chabazite Group: | |
| Chabazite | $(Ca.Na_2)Al_2Si_4O_{12}.6H_2O$ |
| Gmelinite | $(Na_2Ca)Al_2Si_4O_{12}.6H_2O$ |
| Erionite | $(Ca.Mg.Na_2.K_2).Al_2Si_4O_{12}.6H_2O$ |
| Levynite | $Ca(Al_2Si_4O_{12}).6H_2O$ |

-continued

| | |
|---|---|
| Molecular sieve R* | the same as Chabazite |
| Molecular sieve S* | the same as Gmelinite |
| Molecular sieve T* | the same as Elionite |
| (4) Natrolite Group: | |
| Natrolite | $Na_2(Al_2Si_3O_{10}).2H_2O$ |
| Mesolite | $Na_2Ca_2(Al_6Si_9O_{30}).8H_2O$ |
| Scolecite | $Ca(Al_2Si_3O_{10}).3H_2O$ |
| Thomsonite | $NaCa_2(Al_5Si_5O_{20}).6H_2O$ |
| Edingtonite | $Ba(Al_2Si_3O_{10}).4H_2O$ |
| Gonnardite | $Na_2Ca(Al_4Si_6O_{20}).6H_2O$ |
| Rhodesite | $KNaCa_2(H_2Si_8O_{20}).5H_2O$ |
| Mountainite | $KNa_2Ca_2(HSi_8O_{20}).5H_2O$ |
| (5) Harmotome Group: | |
| Harmotome | $Ba_2(Al_4Si_{12}O_{32}).4H_2O$ |
| Phillipsite | $(KxNa_1-x)_5Al_5Si_{11}O_{32}.10H_2O$ |
| Gismondite | $Ca(Al_2Si_2O_8).4H_2O$ |
| Molecular sieve B* | $Na_2(Al_2Si_3O_{10}).5H_2O$ |
| Garronite | $NaCa_{2.5}(Al_3Si_5O_{16})_2.13.5H_2O$ |
| (6) Mordenite Group: | |
| Mordenite | $Na(AlSi_5O_{12}).3H_2O$ |
| D'archiardite | $(Na_2Ca)_2Al_4Si_{20}O_{48}.12H_2O$ |
| Ferrierite | $Na_{1.5}Mg_2(Al_{5.5}Si_{30.5}O_{72}).18H_2O$ |
| Zeolon** | the same as mordenite |
| (7) Zeolites of non-determined structure: | |
| Heulardite | $Ca(Al_2Si_7O_{18})6H_2O$ |
| Clinoptilotite | $Na_{0.95}K_{0.30}Ca_{0.5}(Al_{1.35}Si_{7.05}O_{18})5H_2O$ |
| Stilbite | $Ca(Al_2Si_7O_{18})7H_2O$ |
| Epistilbite | $Ca(Al_2Si_6O_{16}).5H_2O$ |
| Brewsterite | $(Sr,Ba,Ca)Al_2Si_6O_{16}.5H_2O$ |
| Laumontite | $Ca(AlSi_2O_6).4H_2O$ |
| Yugawaralite | $Ca(Al_2Si_5O_{14}).3H_2O$ |
| Paulingite | $(K,Ca,Na)_{120}[(Al,Si)_{580}O_{1160}]69OH_2O$ |
| Aschroftine | $[KNa(Ca,Mg,Mn)]_{120}(Al_{160}Si_{200}O_{720})320H_2O$ |
| Bikitaite | $LiAlSi_2O_6.H_2O$ |

All the above compounds are applicable to the invention.

(8) Zeolite-like compounds:
(8-1) Zeolite-like silicates

NOTE:
*Synthetic zeolite manufactured by Union Carbide Corp., U.S.A.
**Manufactured by Norton Co.

These are not classified as a zeolite, but contain zeolitic water.

| | |
|---|---|
| Beryl | $Al_2Be_3[Si_6O_{18}].nH_2O$ |
| Cordierite | $Mg_2Al_3[AlSi_5O_{18}]nH_2O$ |
| Milarite | $KCa_2AlBe_2[Si_{12}O_{30}]0.5H_2O$ |
| Osumilite | $(K,Na,Ca)(Mg,Fe)_2(Al,Fe)_3[(Si,Al)_{12}O_{30}].H_2O$ |
| Hydrated Nepheline | $KNa_3(Al_4Si_4O_{16}).nH_2O$ |
| Cancrinite | $Na_6Ca_6(Al_6Si_6O_{24})CO_3.3H_2O$ |
| Buddingtonite | $NH_4AlSi_3O_8.0.5H_2O$ |

(8-2) Other Zeolite-like compounds

| | | |
|---|---|---|
| I) | Germanate | $M_3[HGe_4(GeO_4)_3O_4].4H_2O$: (where M is a metal ion.) |
| II) | Phosphate, Arsenate | |
| | Scorodite | $FeAsO_4.2H_2O$ |
| | Pharmacosiderite | $K[Fe_2(OH)_4(AsO_4)_3].6\sim7H_2O$ |
| III) | Water containing metal oxide | |
| | Psilomelane | $(Ba,H_2O)_2.Mn_5O_{10}$ |
| IV) | Three structure complexes | |
| | Prussian blue | $M_3[Fe(CN)6]_2.12H_2O$,(M-MN,Fe,Co,Ni,Zn,Cd) |
| | Weddellite | $CaC_2O_4.(2+x)H_2O$, $(x \leqq 0.5)$ |

The above listed compounds are all applicable to the present invention, and particularly those having large cavity volume and a high water content, hence exhibiting good conductivity, are preferred.

The image forming components used for the present invention are as follows.

I. REDUCTION-TYPE IMAGE FORMING AGENT

1. Tetrazolium Salt Compounds

Compounds containing a tetrazolium salt structure represented by

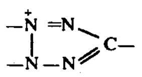

in the molecule and capable of forming a formazan structure represented by

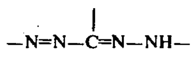

upon cleavage of the ring structure by reduction. Examples of such compounds are as follows:

2,3-diphenyl-5-(*p*-diphenyl)tetrazolium chloride
2,5-diphenyl-3-(*p*-diphenyl)tetrazolium chloride
2,5-diphenyl-3-(*p*-styrylphenyl)tetrazolium chloride
2,3,5-tris(*p*-diphenyl)tetrazolium chloride
2,3,5-triphenyltetrazolium chloride
2,5-diphenyl-3-α-naphthyltetrazolium chloride
2-(*p*-iodophenyl)-3-(*p*-nitrophenyl)-5-phenyltetrazolium chloride
3-(4,5-dimethyl-2-thiazoly)-2,5-diphenyltetrazolium bromide
5-phenyl-2,3-bis(*p*-diphenyl)tetrazolium chloride
2,5-diphenyl-3-(*m*-tolyl)tetrazolium chloride
2,3-di(m-nitrophenyl)tetrazolium perchlorate
3-(*o*-nitrophenyl)-5-methyl-2-phenyltetrazolium chloride
2-phenyl-3-(*p*-carboxyphenyl)-5-methyltetrazolium chloride
3-(4,5-dimethylthiazol-(2))-5-thianil-(2)-2-phenyl tetrazolium bromide
2,3-diphenyl-5-(*p*-methoxyphenyl)tetrazolium chloride
3-(*p*-phenylazophenyl)-2,5-diphenyltetrazolium chloride
2,3-diphenyl-5-hydroxytetrazolium hydroxide
2,3-diphenyl-5-(*p*-acetaminophenyl)tetrazolium chloride
2,3-diphenyl-5-(2-furfuryl)tetrazolium chloride
2-(2-pyridyl)-3-(4-chlorophenyl)-5-phenyltetrazolium acetate
2,5-diphenyl-3-(*p*-nitrophenyl)tetrazolium fluoroborate
3,3′-dianisole-bis[4,4′-(3,5-diphenyl)tetrazolium chloride]
3,3′-(3,3′-dimethoxy-4,4′-biphenylene)bis[2-(*p*-nitrophenyl)-5-phenyltetrazolium chloride]
3,3′-(4,4′-biphenylene)-bis[2,5-diphenyltetrazolium chloride]
2,2′,5,5′-tetrakis(*p*-nitrophenyl)-3,3′-(3,3′-dimethoxy-4,4′-biphenylene)ditetrazolium chloride
3,3′-dimethoxy-4,4′-diphenylene-3″,3″-bis[2-phenyl-5-(2-hydroxyphenyl)tetrazolium acetate]
3,3′-dimethoxy-4,4′-diphenylene-3″,3″-bis[2-phenyl-5-(2-furfuryl)tetrazolium acetate]

2. Triazolium Salt Compounds

Compounds containing a triazolium salt structure represented by

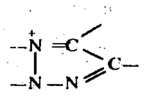

in the molecule thereof and capable of forming a structure represented by

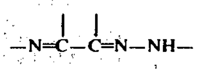

upon cleavage of the ring structure by reduction. Examples of such compounds are as follows:

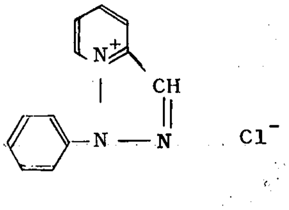

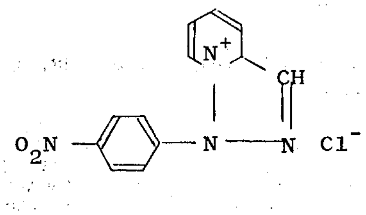

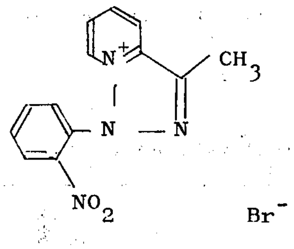

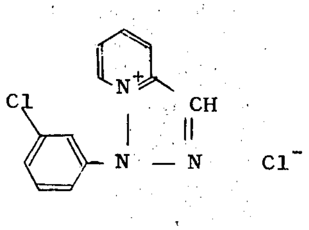

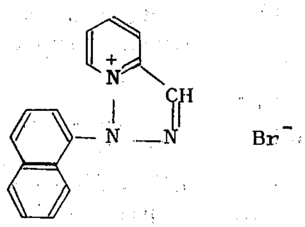

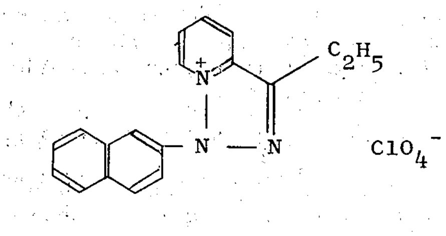

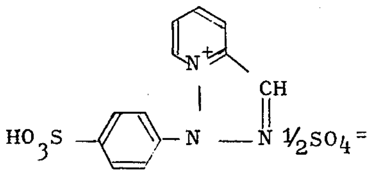
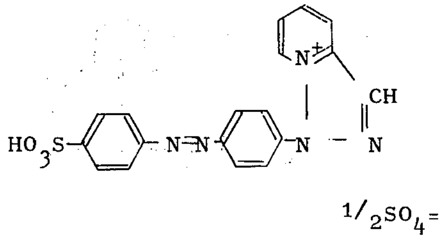
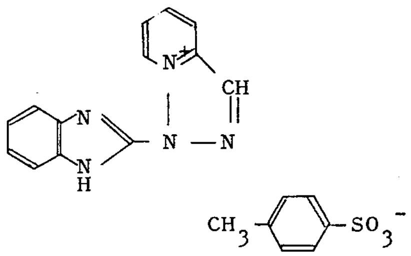
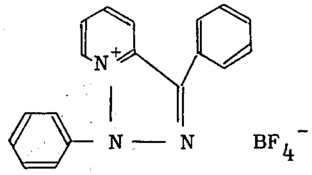
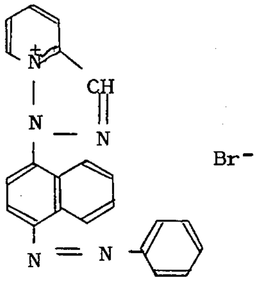
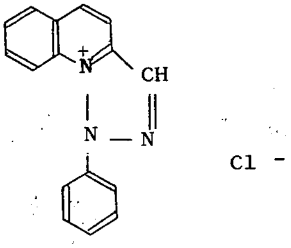
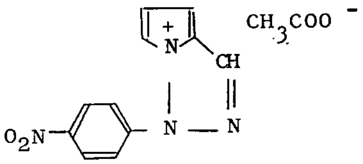
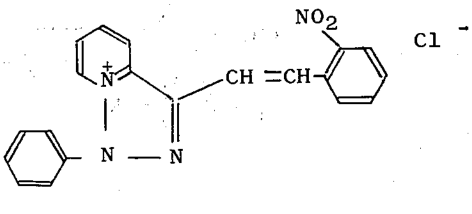
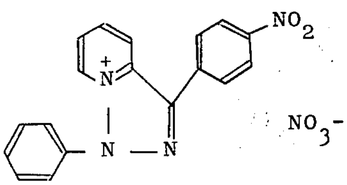
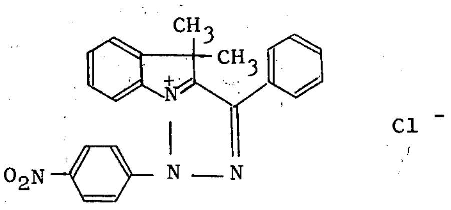
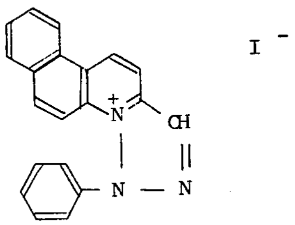
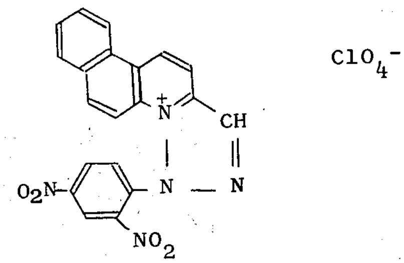

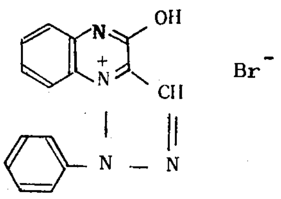
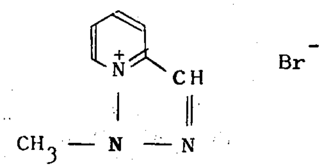
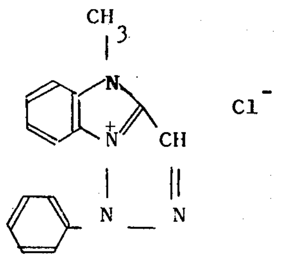
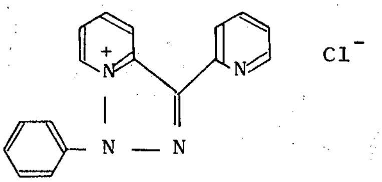
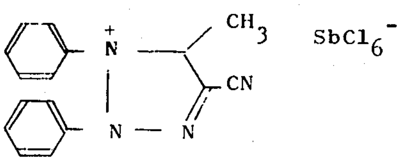
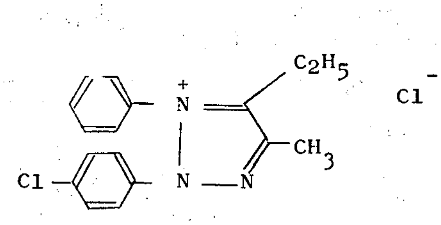
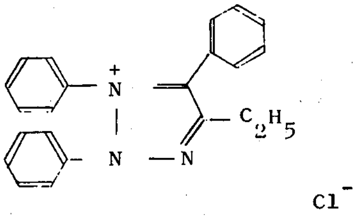
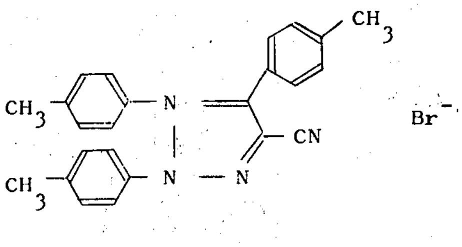
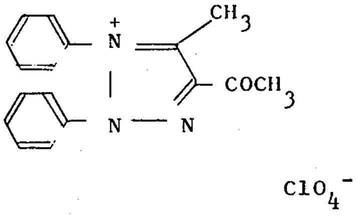
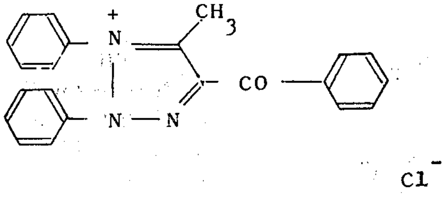
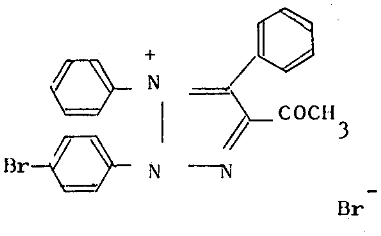
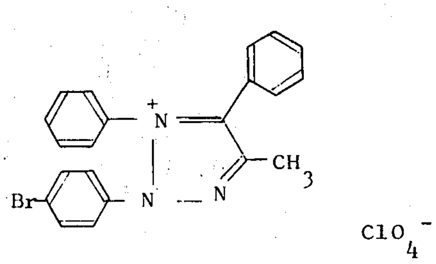

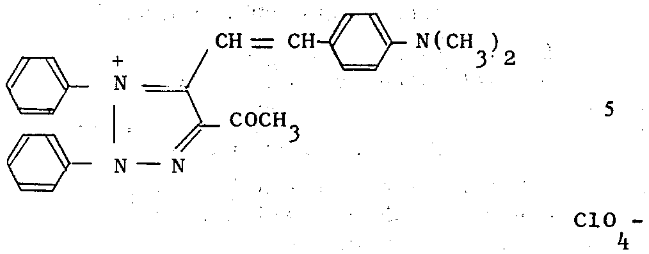
In addition, a triazolium salt having a structure represented by
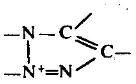
is also capable of forming a structure represented by
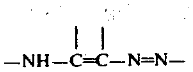
upon cleavage caused by reduction as is the case with the abovementioned triazolium salt. Examples of such triazolium salts are as follows.
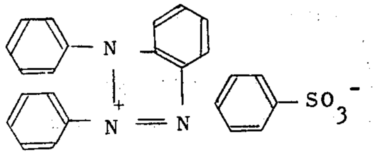
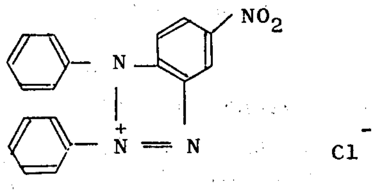
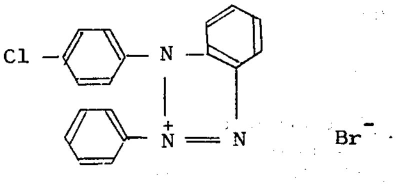
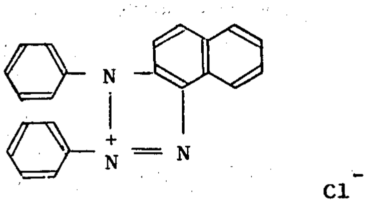
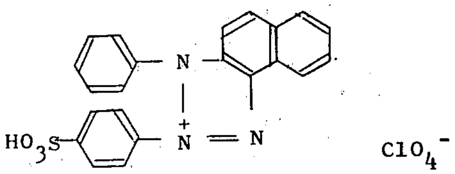

3. Heterocyclic Quaternary Ammonium Salt Compounds Capable of Forming an Anhydronium-Base by a Reduction Reaction These compounds are of such structure that an active methyl group or active methylene group is attached to carbon atoms adjacent to nitrogen atoms which form the heterocycles. Examples of such compounds are as follows:

1-methyl-2-2',4'-dinitrobenzylpyridinium p-toluene sulfonate
1-methyl-4-chloroquinaldinium sulfate
1,2-dimethylbenzothiazolium *p*-toluene sulfonate
1-ethylquinaldinium iodide
1,2-dimethylbenzoxazolium *p*-toluene sulfonate
1,2,3,3-tetramethylindolenium iodide
1-benzyl-2-methylisoquinolinium bromide
1-phenyl-2,3-dimethylquinoxalinium bromide
1-ethyl-2,4-dimethyl-7-acetylamido-1,8-naphthylidinium iodide When the anhydronium-base obtained by the reduction reaction contains the active methylene group, a substance capable of reacting with the active methylene group may be used as an image forming assistant. Such substances are, for example, aminobenzaldehyde derivatives such as *p*-dimethylaminobenzaldehyde, nitrosoaniline derivatives such as *p*-nitrosodimethylaniline, benzoquinone derivatives, and quinoline derivatives.

II. OXIDATION-TYPE IMAGE FORMING AGENT

This colorless or substantially colorless dyestuff intermediate capable of forming such dyestuff by the oxidation reaction, examples of which are as follows:

1. Diphenylmethane Dyestuff Intermediate

Bis(*p*-dimethylaminophenyl)methane
9,9'-diethyl-6,6'-dichloro-3,3'-dicarbazolyl methane
(9-ethyl-6-methyl-3-carbazolyl)-*p*-dimethylaminophenyl methane
leucoauramine
N-phenyl-leucoauramine
N-amyl-leucoauramine
N,N-diethyl-leucoauramine
N- bis(*p*-dimethylaminophenyl)methyl -N,N-dimethylpiperazinium-methylsulfate
Phenylsulfonamido-bis(*p*-dimethylaminophenyl)methane
Bis(*p*-dimethylaminophenyl)benzotriazylmethane
Bis(*p*-diethylminophenyl)morphorynyl methane
Bis(*p*-dimethylaminophenyl)methanol
Bis(*p*-diethylaminophenyl)methoxymethane 2. Triphenylmethane Dyestuff Intermediates Leucomalachite green
3,3'-dicarbazolyl-phenylmethane-leuco-crystal violet
9,9',9''-triethyl-3,3',3''-tricarbazolyl methane
Bis(3-methyl-4-hydroxy-5-carboxyphenyl)-2,6-dichlorophenyl methane
Bis(3-methyl-4-hydroxy-5-carboxyphenyl)-4-diethylaminophenyl methane
Tris(*p*-dimethylaminophenyl)methanol
Tris(*p*-diethylaminophenyl)methoxymethane 3. Xanthene Dyestuff Intermediates 3,6-di(dimethylamino)xanthene
3,6-di(diethylamino)-9-(*o*-carboxyphenyl)xanthydrol 4. Acridine Dyestuff Intermediates 3,6-di(dimethylamino)acridan
3,6-diamino-2,7-dimethyl-9-phenylacridan 5. Azine Dyestuff Intermediates 2-methyl-3-amino-7-dimethylamino-5,10-dihydrophenazine
3,7-diamino-5-phenyl-5,10-dihydrophenazine
3,7-di(dimethylamino)phenoxazine
3,7-di(diethylamino)phenothiazine
2,8-dimethyl-3,7-diamino-5-*o*-tolyl-5,10-dihydrophenazine
2-mercapto-3-hydroxy-7-dimethylaminophenothiazine 6. Reduced Forms of Indigo and Indigonoid Dyestuffs Indigo white
Indigo white disulfate sodium salt
Tetra-acetyl indigo white
Leuco-5,5'-dichloro-thioindigo
Lecuo-thioindigo-*m*-sulfobenzoate sodium salt 7. Leucophthalocyanine Leuco-cobalt phthalocyanine
Leuco-iron-phthalocyanine 8. Reduced Forms of Paraquinone Dyestuffs 2,5-di(p-chloroanilino)-1,4-hydroquinone-disulfate sodium salt
2-(*p*-chloroanilino)-1,4-hydroxynaphthalene disulfate sodium salt
Leuco-Indanthrene Blue RS sodium salt
Anthrazol Yellow V 9. Aromatic Amino Compounds P-aminodiphenyl amine
Diphenylbenzidine
Benzidine
P-phenylene diamine
Diphenyl amine
N,N-dimethyl-*p*-phenylene diamine
4,4'-diaminodiphenyl methane
Methyldiphenylamine-*p*-sulfonic acid 10. Hydroxy Compounds 4-methoxy-naphthol
1,5-dihydroxynaphthalene
Pyrogallol-1,3-dimethyl ether
O-aminophenol 2-amino-3,5-dimethylphenol
Oxydibenzofuran
Flavanol
3,4-dihydroxyflavan
Oxyxanthydrol
Dioxyindole 11. Other Compounds Thioindoxyl
Indoxyl
4-hydroxy-isocarbostyryl
4-aminoantipyrine

III. PH INDICATORS

Pentamethyl rosaniline hydrochloride
2-(*p*-dimethylaminostyryl)-quinoline ethiodide
2,6-dinitrophenol
Tetrabromophenol sulfonphthalein
Tetrabromophenol-tetrabromosulfonphthalein
Dibromo-dichloro-phenolsulfonphthalein
Tetrabromo-m-cresolsulfonphthalein
Dichlorophenolsulfonphthalein
Hematoxyline
Dibromophenolsulfonphthalein
Dibromo-*o*-cresolsulfonphthalein
1,2-dioxyanthraquinone
Quinoline blue(cyanine)dibromo-thymolsulfonphthalein
Phenolsulfonphthalein
*m*-cresolsulfonphthalein
Ethyl-bis(2,4-dinitrophenyl)acetate
5-oxy-1,4-dimethylbenzenesulfonphthalein
*p*-xylenolsulfonphthalein
Thymolsulfonphthalein
Thymolphthalein
Resorcyl-azobenzene-sodium sulfonate
Sodium trinitrobenzoate
Trinitrobenzene
Phenolphthalein
P-nitrophenol
Cresolbenzein
O-cresolphthalein
α-naphtholazobenzene sodium sulfonate
Alizarine Yellow R
Alizarine Yellow GG
Picrylnitromethylamine As the modifying agent, the following reducing agents can be exemplified. These compounds, in the main, contribute to increase the color developing reaction of the image forming component. Whenever the term "reducing agent" is used in this specification, it should be realized that it stands for "the compound having reduction capability".

I. ORGANIC COMPOUNDS HAVING REDUCTION CAPABILITY

1. Aromatic Amines

Phenylhydrazine
Hydrazobenzene
2-hydrazino-benzthiazole
Phenylhydroxylamine
α-naphthylhydrazine
Diphenylhydrazine
Dihydrazino-diphenyl
Semicarbazide
Aminoguanidine
P-aminodiphenyl amine
1,2,4-triaminobenzene
P-phenylene diamine
O-phenylene diamine
4-amino-2-acetamide-N-diethylaniline
4-amino-2,5-dimethyl-N-diethylaniline
N-diethyl-*p*-phenylene diamine
N-(4-aminophenyl)-morpholine
N-(4-aminophenyl)-piperidine
N-(4-amino-3-methylphenyl)-piperidine
1-(4-aminophenyl)-pyrrolidine
4-amino-3-ethoxy-N-diethylaniline
1,4-diaminonaphthalene 2. Aminophenols P-aminophenol
O-aminophenol
P-methylaminophenol
P-aminoxylenol
2,4-diaminoresorcinol
2,4,6-triaminophenol
N-hydroxyethyl-*p*-aminophenol
P-hydroxyphenylamino-acetic acid
Sodium-1-amino-2-naphthol-6-sulphonate
P-aminosalicylic acid 3. Phenols Hydroquinone
Toluhydroquinone
Chlorohydroquinone
Bromohydroquinone
Dicyanohydroquinone
2-laurylhydroquinone
N-2-(1,4-dihydroxyphenyl)-pyridinium chloride
Catechol
Chlorocatechol
Catechol-*o*-carboxylic acid
Gentisic acid
Protocatechuic ester
Protocatechuic acid
Pyrogallol
Pyrogallol monomethyl ether
Pyrogallol 1,3-dimethyl ether
Methylpyrogallol monomethyl ether
P-acetophenone
Gallic acid
2,5-dihydroxyacetophenone
2,5-dihydroxy-benzophenone
Hexahydroxydiphenyl
Dihydroxymesitylene
Durohydroquinone
2,5-di-ditertiary-butylparacresol
O-cresol
α-naphthol
β-naphthol
Naphthohydroquinone
4-methyl-1-naphthol
4-methoxy-1-naphthol
1,2,3-trihydroxy-naphthalene
Anthrahydroquinone
1,5-dihydroxynaphthalene
Phloroglucine
Naphthol AS 4. Other Compounds Dihydroxyacetone
Ascorbic acid Furoin
Hydrogen peroxide
Hydroxyl amine
Hydrazine
1-phenyl-3-methyl-4-amino-5-pyrazolone
4-hydroxyisocarbostyril
Indoxyl
Thioindoxyl
Indandione-1,3,5-chlorocumarone-3
N-ethyl-oxyindole
3-phenylisooxazolone-5
Pyrimidazolone
N-phenyl-homophthalimide
Leuco-indigo
Phenazine
6-amino-1-ethyl-1,2,3,4-tetrahydroquinoline
5-amino-1-(β-methylsulfonamido ethyl)-2,3-dihydroindole

II. INORGANIC COMPOUNDS HAVING REDUCTION CAPABILITY

Ferric chloride
Cupric chloride
Stannic chloride

Besides the above, the following may be listed as inorganic reducing agents:

Sodium dithionate
Iron ethylenediamine-tetra-acetate (chelate)
Hydrosulfite

Furthermore, in the present invention, stability of the formed image against lapse of time and the preserving stability of the image recording member per se can be remarkably improved by combined use of various sorts of organic acids and some inorganic acids as the pH adjusting component along with the afore-listed reducing agents. Examples of such acids are as follows.

1. Aliphatic Carboxylic Acids a. Monocarboxylic Acids

Acetic acid
Formic acid
Lauric acid
Myristic acid
Palmitic acid
Butyric acid
Stearic acid
Behenic acid
Triethyl acetic acid
Crotonic acid
Tiglic acid
β-bromopropionic acid
β,β-dibromopropionic acid
α-bromocrotonic acid b. Di- and Poly-Carboxylic Acids Oxalic acid
Malonic acid
Succinic acid
Glutaric acid
Citric acid
Adipic acid
Monochloro-succinic acid
Monomethyl-succinic acid
Maleic acid
Fumaric acid
Acetylene-dicarboxylic acid
Propane-1,2,3-tricarboxylic acid
Tartaric acid
Acetone dicarboxylic acid 2. Aromatic Carboxylic Acids a. Monocarboxylic Acids Benzoic acid
2,4-dimethyl-benzoic acid
Paranitro-benzoic acid
Parasulfo-benzoic acid
Salicylic acid
2,4-dichlorobenzoic acid
Cinnamic acid b. Di- and Poly-Carboxylic Acids Phthalic acid
3-hydroxyphthalic acid
4-nitrophthalic acid
3-aminophthalic acid
4-chlorophthalic acid
Trimellitic acid
1,2-naphthalene-dicarboxylic acid
Pyromellitic acid
Phenol-2,4,6-tricarboxylic acid 3. Imides Succinimide
Phthalimide 4. Phenols Trinitrophenol (picric acid)
Trichlorophenol 5. Inorganic Acids Boric acid
Pyrophosphoric acid 6. Other Acids Nicotinic acid
Barbituric acid
Cyanuric acid
Hippuric acid For the binding agent to be used for the present invention, the following may be enumerated:

1. Natural High Polymers

Gelatin
Casein
Starch

2. Cellulose Derivatives

Cellulose nitrate
Carboxymethyl cellulose

3. Semi-Synthesized High Polymers

Chlorinated rubber
Cyclized rubber
Other plasticized products of natural rubber

4. Polymerization-Type Synthetic High Polymers

Polyisobutyrene
Polystyrene
Terpene resin
Polyacrylic acid
Polyacrylic acid ester (Polyacrylate)
Polymethacrylic acid ester (Polymethacrylate)
Polyacrylonitrile
Polyacryl amide
Polyvinyl acetate
Polyvinyl alcohol
Polyvinyl pyrrolidone
Polyacetal resin
Polyvinyl chloride
Polyvinyl pyridine
Polyvinyl carbazole
Polybutadiene
Poly(styrene-butadiene)
Butyl rubber
Polyoxymethylene
Polyethylene imine
Polyethylene imine hydrochloride
Poly(2-acryloxyethyl-dimethyl-sulfonium chloride)

5. Condensation-Polymerization Type Synthetic High Polymers

Phenolic resin
Amino resin
Toluene resin
Alkyd resin
Unsaturated polyester resin
Allyl resin
Polycarbonate
Polyamide resin
Polyether resin
Silicone resin
Furan resin
Thiokol rubber 6. Addition-Polymerization Type Resins Polyurethane
Poly(urea-epoxy) resin For the image holding body, or substrate, there can be used the following various materials:

Paper
Resin film
Conductive material such as metal
Conductive paper treated with thin metal film
Conductive paper having thereon vapor-deposited metal
Conductive paper coated with metal powder
Conductive paper treated with carbon

A. PRODUCTION OF THE IMAGE RECORDING MEMBER ACCORDING TO THE PRESENT INVENTION

The image recording member according to the present invention can be manufactured in the following manner.

The zeolitic water-containing compound, the image forming component, and the modifier in a quantity which is arbitrarily selectable from a range of 5 to 0.01 parts by weight with respect to 1 part by weight of the abovementioned image forming component are uniformly dispersed in the binding agent together with, if necessary, a masking agent, toner, and other additives. After this dispersion, the dispersed material is caused to be held on the substrate by means of coating, dipping, or paper-manufacturing art in the form of a recording layer.

For the purpose of the present invention, there is no particular limitation to the amount of the zeolitic water-containing compound to be present in the substrate. In ordinary case, however, its content ranges from 30 to 98% by weight with respect to the total weight of the components to be dispersed, or more preferably, in a range of from 50 to 95% by weight, or optimumly in a range of from 70 to 90% by weight.

For the sake of the fullest understanding of the invention, more detailed explanations will follow hereinafter with reference to the accompanying drawing.

Referring to FIG. 1, the image recording member comprises a recording layer 1, a conductive layer 2 beneath the recording layer 1, and an appropriate substrate 3, on which the recording layer 1 and the conductive layer 2 are closely adhered.

The recording layer 1 contains therein at least the zeolitic water containing compound, the image forming component, the modifier, and the binder.

Figure 2:
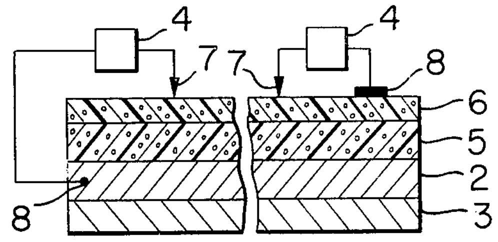

FIG. 2 is a modification of the image recording member shown in FIG. 1 above, wherein the modified structure of the image recording member is shown to comprise the substrate 3, the conductive layer 2 coated thereon, an electric conduction layer 5 which does not contain the image forming component and the modifier as present in the recording layer 1 of the structure shown in FIG. 1, and a separate image forming layer 6 containing therein at least such image forming component and the modifier.

In the case of the recording member structure shown in FIG. 2, both electric conduction layer 5 and the image forming layer 6 as combined stand for the recording layer 1 of the structure shown in FIG. 1.

Figure 3:
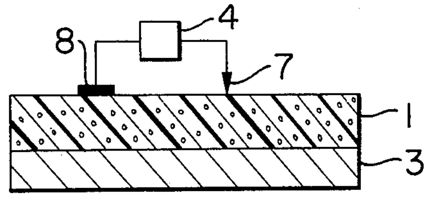

In FIG. 3, a more simplified form of the image recording member is shown, wherein it is constructed with the substrate 3 and the recording layer 1.

For the purpose of the image recording by means of electric conduction, using the above-described construction of the image recording member according to the present invention, a feedback electrode 8 may be directly taken from the conductive layer 2, or may be taken from either the recording layer 1 or the image forming layer 6. Further, polarity of the electric current to be imparted to a stylus 7 may be either positive (+) or negative (−), or an alternating current. The reference numeral 4 in the drawings designates a power source.

PREFERRED EXAMPLES

In order to enable those persons skilled in the art to reduce the present invention into practice, the following preferred examples are presented. It should, however, be noted that these examples are illustrative only, and they do not intend to limit the scope of the present invention as set forth in the appended claims.

Example 1

1 gr. of 5-phenyl-2,3-bis(p-diphenyl)tetrazolium chloride and 0.07 gr. of hydroquinone were added to a mixture of 30 gr. of Molecular Sieve 13X (a faujasite type synthetic zeolite manufactured by Union Carbide Corp., U.S.A), 10 gr. of rutile type titanium oxide, 10 gr. of polyvinyl butyral (having a polymerization degree of 1,500), and 150 gr. of ethanol, and the whole batch was kneaded for two days and nights in a ball mill.

The finely dispersed liquid thus obtained was applied onto the surface of a carbon-treated conductive paper by use of a coating rod. After drying the applied liquid under natural conditions, an image recording was carried out by electric conduction in such a manner that a tungsten stylus was connected to the negative (−) polarity and the carbon layer on the conductive paper to the positive (+) polarity, across which a voltage of approximately 150 volts was impressed, and the stylus was caused to scan the paper.

As the result of the electric conduction, the portion on the conductive paper scanned by the stylus developed reddish-purple color, and a satisfactory image could be reproduced. No issuance of irritating smell, nor dust from perforation by the stylus could be recognized at the time of the recording.

Further, there was recognized substantially no difference in the density of the color development in the reproduced image, even when the polarity, with which the stylus is to be connected was changed from the negative (−) to the positive (+) or the alternating current was used.

Example 2

The same procedures as in Example 1 above were followed in preparing the dispersed liquid, except for substituting the below-listed various reducing agents for the hydroquinone. The method of coating the dispersed liquid and the image recording were also the same as in Example 1 above.

The results of the image recording using these different kinds of reducing agent are tabulated in the following Table 1.

Table 1

| Reducing Agent | *Adding Quantity | Recordability | Polarity of Stylus |
|---|---|---|---|
| Diphenyl hydrazine | 3.0 | Good | (+), (−), AC |
| 2-hydrazinobenzthiazole | 0.1 | Good | (+), (−), AC |
| Paraphenylene diamine | 0.1 | Good | (+), (−), AC |
| 4-amino-2,5-dimethyl-N-diethylaniline | 0.07 | Very Good | (+), (−), AC |
| P-methylaminophenol | 0.1 | Very Good | (+), (−), AC |
| P-amino-salicylic acid | 0.5 | Very Good | (+), (−), AC |
| Chlorohydroquinone | 0.2 | Very Good | (+), (−), AC |
| Catechol | 0.3 | Very Good | (+), (−), AC |
| Pyrogallol | 0.1 | Very Good | (+), (−), AC |
| Gallic Acid | 0.07 | Very Good | (+), (−), AC |
| 2,5-ditertiary-butyl-paracresol | 5.0 | Slight effect | (+), (−), AC |
| Phloro glucine | 0.05 | Good | (+), (−), AC |
| Anthrahydroquinone | 0.03 | Slight effect | (+), (−), AC |
| Ascorbic Acid | 0.05 | Good | (−), (+), AC |
| Furoin | 1.0 | Slight Effect | (−), (+), AC |
| 1-phenyl-3-methyl-4-amino-5-pyrazolone | 0.1 | Good | (−), (+), AC |
| 4-hydroxyisocarbostyryl | 0.1 | Good | (−), (+), AC |
| Indandione-1,3 | 0.01 | Slight Effect | (−), (+), AC |
| N-ethyloxyindole | 0.03 | Slight Effect | (−), (+), AC |
| Phenazine | 0.1 | Good | (−), (+), AC |
| 4-methoxy-1-naphthol | 0.1 | Good | (−), (+), AC |
| α-naphthol | 0.08 | Very Good | (−), (+), AC |
| Naphthol AS | 0.1 | Good | (−), (+), AC |
| 6-amino-1-ethyl-1,2,3,4-tetrahydroquinoline | 0.2 | Very Good | (−), (+), AC |
| Sodium dithionate | 0.1 | Good | (−), (+), AC |
| Iron ethylenediaminetetra-acetate(chelate) | 0.1 | Good | (−), (+), AC |
| Ferric chloride | 0.1 | Good | (−), (+), AC |
| Ferric oxalate | 0.1 | Good | (−), (+), AC |

Note:
*"Part by weight" with respect to 1 part by weight of 5-phenyl-2,3-bis (p-diphenyl)tetrazolium chloride.

Example 3

The same procedures as in Example 1 above were followed in preparing the dispersed liquid, except for substituting the below-listed various image forming components for 5-phenyl-2,3-bis(p-diphenyl)tetrazolium chlorides. The method of coating the dispersed liquid and the image recording were also the same as in Example 1 above.

The results of the image recording using these different kinds of the image forming components are tabulated in the following Table 2.

Table 2

| Image Forming Component | Recordability | Color of Recorded Image | Polarity of Stylus |
|---|---|---|---|
| 2,5-diphenyl-3-(4-styrylphenyl)tetrazolium chloride | Very Good | Reddish purple | (+), (−), AC |
| 3-(4,5-dimethyl-2-thiazolyl-2,5-diphenyl-tetrazolium chloride | Very Good | Dark purple | (+), (−), AC |
| 3,3'-(4,4'-biphenylene)-bis(2,5-diphenyltetrazolium chloride) | Very Good | Dark purple | (+), (−), AC |
| 3,3'-dianisol-bis[4,4'-(3,5-diphenyl) tetrazolium chloride] | Very Good | Bluish black | (+), (−), AC |
| 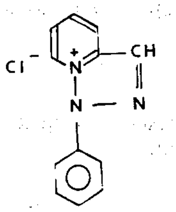 | Very Good | Yellow | (+), (−), AC |
| 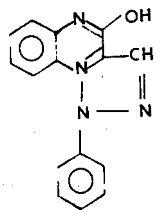 | Good | Red | (+), (−), AC |
| 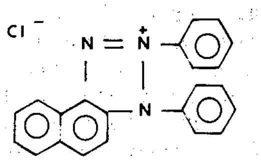 | Good | Red | (+), (−), AC |
| 1-methyl-2,2',4-dinitrobenzylpyridinium p-toluene sulfonate | Very Good | Blue | (+), (−), AC |
| 4-chloroquinaline-metho-sulfate | Good | Red | (+), (−), AC |
| 1,2-dimethylbenzothiazolium p-toluene sulfonate | Good | Yellow | (+), (−), AC |
| 9,9'-diethyl-6,6'-dichloro-3,3'-dicarbazolylmethane | Very Good | Blue | (−), (+), AC |
| Leuco-auramine | Good | Yellow | (−), (+), AC |
| Leuco-malachite Green | Good | Green | (−), (+), AC |
| 3,6-di(dimethylamino)-xanthene | Good | Red | (−), (+), AC |
| 3,6-diamino-2,7-dimethyl-9-phenylacrydan | Good | Red | (−), (+), AC |
| 3,7-di(dimethylamino)-phenoxazine | Very Good | Blue | (−), (+), AC |
| Leuco-cobalt-phthalocyanine | Good | Green | (−), (+), AC |
| 2,5-di-p-chloroanilino-1,4-hydroquinone disulfate ester salt | Very Good | Yellow | (−), (+), AC |
| Anthrasol Yellow V | Good | Yellow | (−), (+), AC |
| P-Aminodiphenylamine | Good | Purple | (−), (+), AC |
| Diphenylbenzidine | Good | Purple | (−), (+), AC |
| 4-methoxy-1-naphthol | Very Good | Blue | (−), (+), AC |
| 2,-mercapto-3-hydroxy-7-dimethylamino-phenothiazine | Very Good | Blue | (−), (+), AC |
| Indoxyl | Good | Blue | (−), (+), AC |
| Tetrabromophenol-sulfonphthalein | Good | Bluish purple | (−), (+), AC |
| 1,2-dihydroxyanthraquinone | Good | Red | (−), (+), AC |
| Dibromothylmol-sulfon- | Very | | |

Table 2-continued

| Image Forming Component | Recordability | Color of Recorded Image | Polarity of Stylus |
|---|---|---|---|
| phthalein | Good | Blue | (−), (+), AC |
| Rosolic Acid | Good | Red | (−), (+), AC |
| Thymolphthalein | Very Good | Blue | (−), (+), AC |

Note:
"AC" stands for "alternating current".

Example 4

Into a mixture of 1 gr. of 3,3'-(3,3'-dimethoxy-4,4'-biphenylene)-bis [2-(*p*-nitrophenyl)] -5-phenyltetrazolium chloride, 0.1 gr. of 2,5-dihydroxyacetophenone, 10 gr. of polyvinyl butyral having a polymerization degree of 1,500, 5 gr. of rutile type titanium oxide, and 150 gr. of ethanol, there was added 30 gr. of each of the below-listed zeolitic water containing compounds. Each batch containing the different zeolitic water containing compound was then kneaded in a ball mill for 2 days and nights.

The dispersed liquid thus obtained was then applied onto the surface of an aluminum laminate paper by means of a coating rod, followed by drying the coating under heat of 100°C for 5 minutes. Thereafter, the image recording by electric conduction was carried out by connecting the aluminum layer of the laminate paper to the positive (+) polarity and the stylus to the negative (−) polarity, followed by impression of direct current voltage of approximately 150 volts to cause the stylus to scan on the surface of the conductive paper.

The results of the image recording are as shown in the following Table 3.

Table 3

| Zeolite Water-Containing Compounds | Recordablity |
|---|---|
| Molecular Sieve SK-40 | Very Good |
| Molecular Sieve 13X | Very Good |
| Molecular Sieve 5A | Good |
| Weddellite | Good |
| Gismondite | Good |
| Chabazite | Good |
| Scorodite | Slight effect recognized |
| Clinoptilotite | Slight effect recognized |
| Mordenite | Slight effect recognized |
| Natrolite | Slight effect recognized |
| Analcite | Slight effect recognized |
| Psilomelane | Slight effect recognized |
| Cancrinite | Slight effect recognized |
| Rutile-type titanium oxide* | No effect |

Note:
*The rutile type titanium oxide was substituted for the zeolitic water containing compounds for the sake of comparison.

Example 5

The dispersion liquid was prepared by eliminating hydroquinone from the components of Example 1, and the image recording was conducted in exactly the same manner as in this Example 1. It was recognized that the image density had lowered approximately one half of that in the case of Example 1 when the negative or alternating current was impressed, and it lowered approximately a quarter, when the positive polarity was impressed.

Example 6

The following components were mixed and kneaded in a ball mill for full 2 days and nights.

| Ingredients | Quantity (gr) |
|---|---|
| Molecular Sieve SK-40 (a synthetic zeolite produced by Union Carbide Corporation, U.S.A.) | 30 |
| Rutile-type titanium oxide | 10 |
| ARON S-1001 (arylic resin produced by Toa Gosei K.K. Japan) | 20 |
| Mixed solution of toluene and methylethyl ketone (1/1) | 100 |
| Leuco-malachite green | 1 |
| Bromohydroquinone | 0.1 |

The thus obtained dispersed solution was coated on an aluminum-deposited conductive paper by means of a coating rod. After the coating was dried the image recording was conducted by applying direct current at 150 volts and connecting the aluminum deposited surface to the negative polarity (−) and the stylus to the positive polarity (+). A very favorable green image was obtained.

Example 7

From the following ingredients, the image recording member having a recording layer composed of a separate electric conduction layer and an image recording layer as shown in FIG. 2 was formed.

a. Electric-Conduction Layer

The following components were mixed and kneaded in a ball mill for 2 days and nights.

| Ingredients | Quantity |
|---|---|
| Molecular Sieve SK-40 (a synthetic zeolite produced by Union Carbide Corp., U.S.A.) | 30 gr. |
| ARON S-1001 (acrylic resin produced by Toa Gosei K.K., Japan) | 15 gr. |
| Mixed solution of toluene and methylethyl ketone (1/1) | 70 gr. |

The thus obtained dispersed liquid was applied onto the surface of an aluminum-deposited paper by use of a coating rod, and dried sufficiently to make it into the electric-conduction layer.

b. Image Recording Layer

The following components were mixed and kneaded in a ball mill for full 2 days and nights.

| Ingredients | Quantity |
|---|---|
| 2,3,5-tris(p-diphenyl)-tetrazolium chloride | 0.2 gr. |
| Dihydroxymesitylene | 0.04 gr. |
| Molecular Sieve 13X (a synthetic zeolite produced by Union Carbide Corp., U.S.A.) | 5. gr. |
| Polyvinylbutyral (having a polymerization degree of 4,000) | 2. gr. |
| Ethanol | 20. gr. |

The thus obtained dispersed liquid was applied onto the surface of the above-mentioned electric-conduction layer by the use of a coating rod, and dried sufficiently to make it into the image recording layer.

The electric-conduction type image recording member which has thus been manufactured is then subjected to the image recording by impressing electric current at about 150 volts, taken from a direct current power source to cause the stylus to scan on the surface of the image recording sheet. When a current of about 20 mA was caused to pass across the electrodes a favorable dark purple image was obtained.

Example 8

1 gr. of 5-phenyl-2,3-*bis(p-diphenyl)tetrazolium chloride*, 0.07 gr. of hydroquinone, and 0.07 gr. of phthalic acid were added to a mixture solution of 30 gr. of Molecular Sieve 13X (a faujasite type synthetic zeolite produced by Union Carbon Corp., U.S.A.), 10 gr. of rutile-type titanium oxide, 10 gr. of polyvinylbutyral (polymerization degree of 1,500), and 150 gr. of ethanol. The whole batch was kneaded in a ball mill for 2 days and nights.

The thus obtained dispersed liquid was then applied onto a sheet of conductive paper treated with carbon, and dried under a natural condition.

Upon the drying of the liquid as coated, the image recording was conducted by electric conduction in such a manner that the tungsten stylus was connected to the positive (+) polarity, and the carbon layer to the negative (−) polarity, across which electric current at 150 volts was impressed to cause the stylus to scan on the surface of the image recording sheet. As the result of this electric conduction, the portion on the recording sheet scanned by the stylus developed a reddish purple color, and a satisfactory colored image could be obtained. No issuance of irritating smell, nor dust from perforation by the stylus could be recognized.

Example 9

The same procedures as in Example 8 above were followed in preparing the dispersed liquid, except for substituting the below-listed various pH adjusting components for phthalic acid used in the previous example. The method of coating the dispersed liquid and the image recording on the recording sheet were also the same as in Example 8 above.

The results of the image recording using these different kinds of the pH adjusting components are as shown in the following Table 4.

Table 4

| PH Adjusting Components | Recordability | Light Stability at Image Portion | Light Stability at Non-image Portion |
|---|---|---|---|
| Butyric Acid | Good | Good | Poor |
| Palmitic Acid | Good | Good | Poor |
| α-Bromocrotonic Acid | Good | Very Good | Good |
| Oxalic Acid | Very Good | Very Good | Good |
| Succinic Acid | Very Good | Very Good | Good |
| Propane-1,2,3-tricarboxylic acid | Very Good | Very Good | Very Good |
| Benzoic Acid | Good | Good | Poor |
| Cinnamic Acid | Good | Good | Good |
| 4-nitrophthalic Acid | Very Good | Very Good | Very Good |
| 1,2-naphthalane-dicarboxylic Acid | Good | Very Good | Good |
| Pyromellitic Acid | Very Good | Very Good | Very Good |
| Succinic Acid Imide | Good | Good | Good |
| Picric Acid | Very Good | Very Good | Good |
| Pyrophosphoric Acid | Very Good | Very Good | Very Good |
| Boric Acid | Good | Very Good | Good |
| Nicotinic Acid | Good | Good | Poor |
| No additive | Very Good | Very Poor | Very Poor |

Note:
1. "Light Stability at Image Portion " means no color fading at the image portion due to irradiation of the sun light
2. "Light Stability at Non-Image Portion" means no color-developing at the non-image portion due to irradiation of the sun light.

Example 10

The same procedures as in Example 8 above were followed in preparing the dispersed liquid, except for substituting the below-listed various reducing agents for the hydroquinone used in the previous example. The method of coating the dispersed liquid and the image recording on the recording sheet were also the same as in Example 8 above.

The results of the image recording using these different compounds are as shown in the following Table 5.

Table 5

| Reducing Agents | Recordability | Polarity of Stylus |
|---|---|---|
| Diphenylhydrazine | Good | (+), (−), AC |
| 2-hydrazinobenzthiazole | Good | (+), (−), AC |
| Paraphenylenediamine | Good | (+), (−), AC |
| 4-amino-2,5-dimethyl-N-diethylaniline | Very Good | (+), (−), AC |

Table 5-continued

| Reducing Agents | Record-ability | Polarity of Stylus |
|---|---|---|
| P-methylaminophenol | Very Good | (+), (−), AC |
| P-aminosalicylic Acid | Very Good | (+), (−), AC |
| Chlorohydroquinone | Very Good | (+), (−), AC |
| Catechol | Very Good | (+), (−), AC |
| Pyrogallol | Very Good | (+), (−), AC |
| Gallic Acid | Very Good | (+), (−), AC |
| 2,5-ditertiary-butyl-paracresol | Slight effect | (+), (−), AC |
| Phloro glucine | Good | (+), (−), AC |
| Anthrahydroquinone | Slight effect | (+), (−), AC |
| Ascorbic Acid | Good | (+), (−), AC |
| Furoin | Slight effect | (+), (−), AC |
| 1-phenyl-3-methyl-4-amino-5-pyrazolone | Good | (+), (−), AC |
| 4-hydroxyisocarbostyryl | Good | (+), (−), AC |
| Indandione-1,3 | Slight effect | (+), (−), AC |
| N-ethyloxy indole | Slight effect | (+), (−), AC |
| Phenazine | Good | (+), (−), AC |
| 4-methoxy-1-naphthol | Good | (+), (−), AC |
| α-naphthol | Very Good | (+), (−), AC |
| Naphthol AS | Good | (+), (−), AC |
| 6-amino-1-ethyl-1,2,3,4-tetrahydroquinoline | Very Good | (+), (−), AC |
| Sodium dithionate | Good | (+), (−), AC |

Table 5-continued

| Reducing Agents | Record-ability | Polarity of Stylus |
|---|---|---|
| Iron ethylenediamine-tetra-acetate (chelate) | Good | (+), (−), AC |
| Ferric Chloride | Good | (+), (−), AC |
| Ferric Oxalate | Good | (+), (−), AC |

Example 11

The same procedures as in Example 8 above were followed in preparing the dispersed liquid, except for substituting the below-listed various image forming components for 5-phenyl-2,3-bis(p-diphenyl) tetrazolium chloride used in the previous example. The method of coating the dispersed liquid and the image recording on the recording sheet were also the same as in Example 8.

The results of the image recording using these different image forming components are as shown in the following Table 6.

Table 6

| Image Forming Components | Record-ability | Color of Recorded Image | Polarity of Stylus |
|---|---|---|---|
| 2,5-diphenyl-3-(4-styryl-phenyl)tetrazolium chloride | Very Good | Reddish purple | (−), (+), AC |
| 3-(4,5-dimethyl-2-thiazolyl-2,5-diphenyl-tetrazolium chloride | Very Good | Dark purple | (−), (+), AC |
| 3,3'-(4,4'-biphenylene)-bis[2,5-diphenyltetrazolium chloride] | Very Good | Dark purple | (−), (+), AC |
| 3,3'-dianisol-bis[4,4'-(3,5-diphenyl)tetrazolium chloride | Very Good | Bluish black | (−), (+), AC |
| 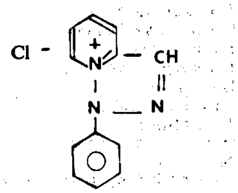 | Very Good | Yellow | (−), (+), AC |
| 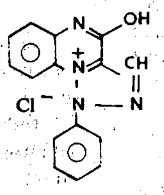 | Good | Red | (−), (+), AC |
| 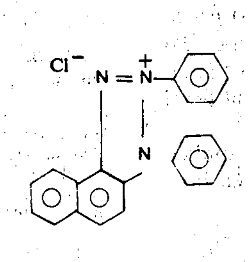 | Good | Red | (−), (+), AC |

Table 6-continued

| Image Forming Components | Recordability | Color of Recorded Image | Polarity of Stylus |
|---|---|---|---|
| 1-methyl-2,2',4'-dinitrobenzylpyridinium p-toluene sulfonate | Very Good | Blue | (−), (+), AC |
| 4-chloroquinaldine-methosulfate | Good | Red | (−), (+), AC |
| 1,2-dimethylbenzothiazolium p-toluene sulfonate | Good | Yellow | (−), (+), AC |
| 9,9'-diethyl-6,6'-dichloro-3,3'-dicarbazolylmethane | Very Good | Blue | (−), (+), AC |
| Leuco-auramine | Good | Yellow | (−), (+), AC |
| Leuco-malachite green | Good | Green | (−), (+), AC |
| 3,6-di(dimethylamino) xanthone | Good | Red | (−), (+), AC |
| 3,6-diamino-2,7-dimethyl-9-phenylacrydan | Good | Red | (−), (+), AC |
| 3,7-di(dimethylamino) phenoxadine | Very Good | Blue | (−), (+), AC |
| Leuco-cobaltphthalocyanine | Good | Green | (−), (+), AC |
| 2,5-di-p-chloroanilino-1,4-hydroquinone disulfate ester salt | Very Good | Yellow | (−), (+), AC |
| Anthrosol Yellow V | Good | Yellow | (−), (+), AC |
| P-aminodiphenylamine | Good | Purple | (−), (+), AC |
| Diphenylbenzidine | Good | Purple | (−), (+), AC |
| 4-methoxy-1-naphthol | Very Good | Blue | (−), (+), AC |
| 2-mercapto-3-hydroxy-7-dimethylamino-phenothiazine | Very Good | Blue | (−), (+), AC |
| Indoxyl | Good | Blue | (−), (+), AC |
| Tetrabromophenol-sulfonphthalein | Good | Bluish purple | (−), (+), AC |
| 1,2-dihydroxyanthraquinone | Good | Red | (−), (+), AC |
| Dibromothimol-sulfophthalein | Very Good | Blue | (−), (+), AC |
| Resolic Acid | Good | Red | (−), (+), AC |
| Thymolphthalein | Very Good | Blue | (−), (+), AC |

Example 12

Into a mixture of 1 gr. of 3,3'-(3,3'-dimethoxy-4,4'-biphenylene)bis[2-(p-nitrophenyl)]-5-phenyltetrazolium chloride, 0.1 gr. of 2,5-dihydroxyacetophenone, 10 gr. of polyvinyl butyral (polymerization degree of 1,500), 0.1 gr. of oxalic acid, 5 gr. of rutile-type titanium oxide, and 150 gr. of ethanol, there was added 30 gr. of each of the below-listed zeolitic water-containing compounds. Each batch containing the different kind of zeolitic water-containing compounds was then kneaded in a ball mill for 2 days and nights.

The dispersed liquid thus obtained was then applied onto the surface of an aluminium laminate paper by means of a coating rod, followed by drying the coating at 100°C for 5 minutes. Thereafter, the image recording was conducted by electric conduction in such a manner that the tungsten stylus was connected to the negative (−) polarity and the aluminium layer to the positive polarity, across which direct current at approximately 150 volts was impressed to cause the stylus to scan on the surface of the conductive paper.

The results of the image recording are as shown in the following Table 7.

Table 7

| Zeolitic Water-Containing Compounds | Recordability | Water Content (wt. %) |
|---|---|---|
| Molecular Sieve SK-40 | Very Good | 38 |
| Molecular Sieve 13X | Very Good | 38 |
| Molecular Sieve 5A | Good | 28 |
| Weddellite | Good | 26 |
| Gismondite | Good | 21 |
| Chabazite | Good | 20 |
| Scorodite | Slight effect | 16 |
| Clinoptilotite | Slight effect | 14 |

Table 7-continued

| Zeolitic Water-Containing Compounds | Recordability | Water Content (wt. %) |
|---|---|---|
| Mordenite | Slight effect | 12 |
| Natrolite | Slight effect | 9 |
| Analcite | Slight effect | 8 |
| Psilomelane | Slight effect | 5 |
| Cancrinite | Slight effect | 4 |
| Rutile-type titanium oxide* | No effect | Almost none |

Note:
*The rutile type titanium oxide was substituted for the zeolitic water-containing compounds for the sake of comparison.

Example 13

The same procedures as in Example 8 were followed in preparing the dispersed liquid, with the exception that hydroquinone was not used, and instead the adding quantity of 5-phenyl-2,3-bis(*p*-diphenyl)tetrazolium chloride used as the image forming component was increased to 3 gr., which stands for three times as large as that in Example 8. The method of coating the dispersed liquid and the image recording were also the same as in Example 8 above. As the result of this, a satisfactory colored image as equal as that in Example 8 could be obtained.

Example 14

It was observed that absence of phthalic acid from the dispersed liquid in Example 8 began to affect the recordability of the image recording sheet during its storage in a dark place after twelve months.

By the use of phthalic acid, it was verified that no change occurred in the recordability of the image recording sheet as long as 20 months or more.

As detailed in the foregoing, the present invention possesses various advantages as will be summaried hereinbelow.

1. Defects such as running of the recorded image, deformation of the recording sheet, difficulty in long-term preservation, and so forth which have been inherent in the conventional electrolytic recording method can be eliminated, and high quality of the recorded image can be obtained.

2. In view of the electric conduction being carried out in utilization of the electric conductivity of the zeolitic water containing compound per se, there is no necessity for particular treatment for the electric conductivity to be effected. On account of this, various treatments to render the image recording material to be electrically conductive as has been done in the conventional dry-type electric conduction image recording,, such that metallic compounds are subjected to special treatment for the electric conductivity, or metal thin film is formed on the surface of the white pigment particles so as to be electrically conductive, and so on, can be entirely dispensed with. Moreover, many of the zeolitic water containing compounds are white in color, which color tone is very desirable as the material for the image recording sheet. In addition, while the metallic compounds and the pigments resulted from the treatment for the electric conductivity are mostly toxic, the zeolitic water-containing compounds to be used for the present invention are perfectly non-toxic, hence there is no apprehension of environmental pollution at the time of production as well as use of such image recording sheet.

3. By simultaneous use of the modifier, particularly the compounds having the reduction capability, it becomes possible to reduce the quantity of the image forming components required to obtain the image density equal to that obtained in the case where such compound is not used by one third to one fifth or so, whereby the image recording member can be manufactured most economically, which is very favorable from a practical standpoint.

4. Even when the image forming component, the degree of color development of which is low only by the electric conduction through the zeolitic water-containing compound, such color tone can be improved by addition of the compound having the reduction capability.

5. In the image recording member, consisting of the zeolitic water containing compound and the image forming component without the modifier of the present invention being added, there has been some image forming component which produces difference in the quality of the image reproduced at the time of the recording due to difference in the polarity with which the stylus is connected. In the present invention, however, it is always possible that uniform quality of image can be obtained with any current polarity such as negative, positive, or alternating current being given to the stylus, regardless of the kind of the image forming component to be used. This assures that the present invention definitely improves operability of the image recording method.

6. Additional use of the pH adjusting components along with the image forming component and the reducing agent prevents the dark reaction between the reducing agent and the image forming component.

7. Further, by the use of the pH adjusting component, color development at the undeveloped portion due to light irradiation and color fading at the developed portion due to the light irradiation can be prevented, whereby stability in preservation of the recorded image can be improved.

As has been described hereinbefore, since the present invention supplements various disadvantages inherent in the conventional image recording member, and moreover possesses novel features, it has wide varieties of use. For instance, it can be used as the recording member for receiving facsimile signals such as in transmission of newspaper, meteorological chart, documents, and so forth, as well as the recording member for various measuring instruments such as for industrial purposes, medical purposes, and general office purposes, and so forth, and the recording member for outputs of computers and its terminal equipments.

We claim:

1. An electrical recording member comprising a support and a recording layer thereon which comprises a binder having uniformly dispersed therein an electrically-conductive agent, an image-forming component and a reducing agent, said electrically-conductive agent being a zeolitic water-containing compound and said image-forming component being a member selected from the group consisting of reduction-type image-forming agents, oxidation-type image-forming agents and pH indicators.

2. An electrical recording member as claimed in claim 1 wherein said recording layer further comprises, dispersed in said binder, at least one pH adjusting acid.

3. An electrical recording member as claimed in claim 2 wherein said pH adjusting acid is a member selected from the group consisting of an aliphatic carboxylic acid, an aromatic carboxylic acid, an imide, a phenol and an inorganic acid.

4. An electrical recording member as claimed in claim 2 wherein the amount of said reducing agent and the amount of said pH adjusting acid in said recording layer are each from 0.01 to 5 parts by weight per 1 part by weight of said image-forming component.

5. An electrical recording member as claimed in claim 1, wherein the amount of said reducing agent in said recording layer is from 0.01 to 5 parts by weight per 1 part by weight of said image-forming component.

6. An electrical recording member as claimed in claim 1 wherein said reducing agent is an organic reducing agent selected from the group consisting of aromatic amines, aminophenols and phenols.

7. An electrical recording member as claimed in claim 1 wherein said reducing agent is an inorganic reducing agent selected from the group consisting of ferric chloride, cupric chloride and stannic chloride.

8. An electrical recording member as claimed in claim 1 wherein said image-forming component is a reduction-type image-forming agent selected from the group consisting of:

1. a tetrazolium salt compound having the structure

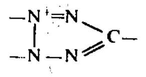

in its molecule and being capable of forming, upon cleavage of said structure by reduction, the structure

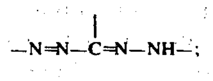

2. a triazolium salt compound having the structure

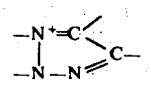

in its molecule and being capable of forming, upon cleavage of said structure by reduction, the structure

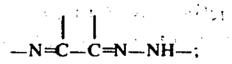

3. a triazolium salt compound having the structure

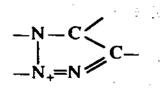

in its molecule and being capable of forming, upon cleavage of said structure by reduction, the structure

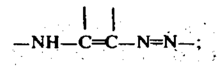

and 4. heterocyclic quaternary ammonium salts capable of forming an anhydronium base compound by reduction thereof.

9. An electrical recording member as claimed in claim 1 wherein said image-forming component is an oxidation-type image-forming agent selected from the group consisting of diphenolmethane dyes, triphenolmethane dyes, xanthene dyes, acridine dyes, azine dyes, reduced Indigo dyes, reduced Indigonoid dyes, leucophthalocyanine dyes, reduced paraquinone dyes, aromatic amino compounds and hydroxy compounds.

10. An electrical recording member as claimed in claim 1 wherein said zeolitic water-containing compound is a compound of the sodalite group, the chabozite group, the natrolite group, the harmatome group, the analcite group or the mordenite group.

11. An electrical recording member according to claim 1 wherein said zeolitic water-containing compound is a silicate compound containing zeolitic water.

12. An electrical recording member as claimed in claim 1 wherein said zeolitic water-containing compound is a natural zeolite represented by the formula:

$$[M^{+2}\ ,\ (M^{+1})_2]O.Al_2O_3\ .\ mSiO_2\ .\ n\ H_2O$$

wherein $M^{+2}$ and $M^{+1}$ represent, respectively, divalent and monovalent metal ions capable of being replaced with other cations, $m$ is from 3 to 10 and $n$ is a positive integer.

13. An electrical recording member as claimed in claim 1 wherein said binder is a member selected from the group consisting of natural polymers, cellulose derivatives, semi-synthetic polymers, polymerization-type synthetic polymers, condensation-polymerization-type synthetic polymers and addition-polymerization-type resins.

14. An electrical recording member as claimed in claim 1 wherein the amount of said zeolitic water-containing compound in said recording layer is from 30% to 98% by weight, based upon the total weight of said electrically-conductive agent, said image-forming component and said reducing agent.

15. An electrical recording member according to claim 1 wherein said support is composed of an electrically-conductive material.

16. An electrical recording member as claimed in claim 1 wherein the amount of said image-forming component in said recording layer is from 70% to 90% by weight, based upon the total weight of said electrically-conductive agent, said image-forming component and said reducing agent.

17. An electrical recording member as claimed in claim 1 wherein said recording layer consists of a single layer composed of a binder having uniformly dispersed therein said electrically-conductive agent, said image-forming component and said reducing agent.

18. An electrical recording member as claimed in claim 1 which comprises a support, an electrically-conductive layer on said support which is composed of a binder having dispersed therein at least an electrically-conductive zeolitic water-containing compound, and on said electrically-conductive layer, a recording layer which comprises a binder having uniformly dispersed therein an electrically-conductive agent, an image-forming component and a reducing agent, said electrically-conductive agent being a zeolitic water-containing compound and said image-forming component being a member selected from the group consisting of reduction-type image-forming agents, oxidation-type image-forming agents, and pH indicators.

19. A method of image recording which comprises the step of applying electric current to a recording layer which is composed of a binder having uniformly dispersed therein an electrically-conductive zeolitic water-containing compound, a reducing agent, and an image-forming component selected from the group consisting of reduction-type image-forming agents, oxidation-type image-forming agents and pH indicators.

20. The image recording method as claimed in claim 19 wherein said electric current is applied to said recording layer by scanning the surface of said recording layer with an image recording stylus.

21. The image recording method as claimed in claim 19 wherein said recording layer further contains, dispersed in said binder, a pH adjusting acid.

22. The image recording method as claimed in claim 21 wherein said pH adjusting acid is a member selected from the group consisting of an aliphatic carboxylic acid, an aromatic carboxylic acid, an imide, a phenol and an inorganic acid.

23. The image recording method as claimed in claim 21 wherein the amount of said reducing agent and the amount of said pH adjusting acid in said recording layer, are each from 0.01 to 5 parts by weight per 1 part by weight of said image-forming component.

24. The image recording method as claimed in claim 19 wherein said reducing agent is an organic reducing agent selected from the group consisting of aromatic amines, aminophenols and phenols, or an inorganic reducing agent selected from the group consisting of ferric chloride, cupric chloride, and stannic chloride.

25. The image recording method as claimed in claim 19 wherein said image-forming component is a reduction-type image-forming agent selected from the group consisting of 1. a tetrazolium salt compound having the structure

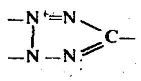

in its molecule and being capable of forming, upon cleavage of said structure by reduction, the structure

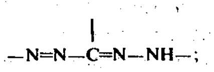

2. a triazolium salt compound having the structure

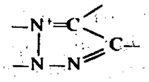

in its molecule and being capable of forming, upon cleavage of said structure by reduction, the structure

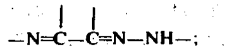

3. a triazolium salt compound having the structure

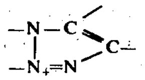

in its molecule and being capable of forming, upon cleavage of said structure by reduction, the structure

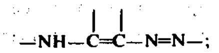

4. heterocyclic quaternary ammonium salts capable of forming an anhydronium base compound by reduction thereof.

26. The image recording method as claimed in claim 19 wherein said image-forming component is an oxidation-type image-forming agent selected from the group consisting of diphenol-methane dyes, triphenolmethane dyes, xanthene dyes, acridine dyes, azine dyes, reduced Indigo dyes, reduced Indigonoid dyes, leucophthalocyanine dyes, reduced paraquinone dyes, aromatic amino compounds and hydroxy compounds.

27. The image recording method as claimed in claim 19 wherein said zeolitic water-containing compound is a compound of the sodalite group, the chabozite group, the natrolite group, the harmatome group, the analcite group or the mordenite group.

28. The image recording method as claimed in claim 19 wherein said zeolitic water-containing compound is a silicate compound containing zeolitic water.

29. The image recording method as claimed in claim 19 wherein said zeolitic water-containing compound is a natural zeolite represented by the formula:

$$[M^{+2}, (M^{+1})_2]\ O.Al_2O_3\ .\ mSiO_2\ .\ n\ H_2O$$

wherein $M^{+2}$ and $M^{+1}$ represent, respectively, divalent and monovalent metal ions capable of being replaced with other cations, $m$ is from 3 to 10 and $n$ is a positive integer.

30. The image recording method as claimed in claim 19 wherein said binder is selected from the group consisting of natural polymers, cellulose derivatives, semi-synthetic polymers, polymerization-type synthetic polymers, condensation-polymerization-type synthetic polymers and addition-polymerization-type resins.

31. The image recording method as claimed in claim 19 wherein the amount of said zeolitic water-containing compound in said recording layer is from 30% to 98% by weight, based upon the total weight of said electrically-conductive agent, said image-forming component and said reducing agent.

* * * * *

UNITED STATES PATENT OFFICE

CERTIFICATE OF CORRECTION

Patent No. 3,974,041 Dated August 10, 1976

Inventor(s) MASAHIRO HARUTA, YASUSHI TAKATORI, AKEMI SHIMOSAWA, KATSUHIKO NISHIDE, AND MITSUNOBU NAKAZAWA It is certified that error appears in the above-identified patent and that said Letters Patent are hereby corrected as shown below:

Column 1, line 9, "signals" should read --receiving signals--.

Column 2, line 53, "image reaction" should read --image forming reaction--.

Column 4, line 40, "suubstantially" should read --substantially--.

Column 8, line 11, "3\"" should read --3"--.

Column 15, line 36 "This colorless" should read --This is a colorless--.

Column 15, line 54, "p-diethylminophenyl" should read --p-diethylaminophenyl--.

Column 25, line 45, "4-chloroquinaline-metho-sulfate" should read --1-methyl-4-chloroquinaldinium sulfate--.

Column 27, Table 3, column heading, "Zeolite Water - Containing Compounds" should read --Zeolitic Water - Containing Compounds--.

Column 33, line 9, "4-chloroquinaldine-methosulfate" should read --1-methyl-4-chloroquinaldinium sulfate--.

UNITED STATES PATENT OFFICE
CERTIFICATE OF CORRECTION

Patent No. 3,974,041 Dated August 10, 1976

Inventor(s) MASAHIRO HARUTA, YASUSHI TAKATORI, AKEMA SHIMOSAWA, KATSUHIKO NISHIDE, AND MITSUNOBU NAKAZAWA It is certified that error appears in the above-identified patent and that said Letters Patent are hereby corrected as shown below:

Column 37, line 20,

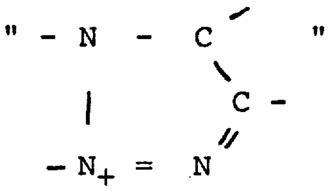

should read

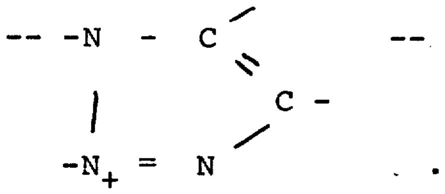

Column 39, line 35, after the semi-colon insert --and--.

Signed and Sealed this

First Day of March 1977

[SEAL]

*Attest:*

RUTH C. MASON
*Attesting Officer*

C. MARSHALL DANN
*Commissioner of Patents and Trademarks*